United States Patent
Mori

(10) Patent No.: US 11,333,600 B2
(45) Date of Patent: May 17, 2022

(54) ANALYSIS METHOD, ANALYSIS APPARATUS, PRINTER, AND PRINT SYSTEM

(71) Applicant: Eiichi Mori, Tokyo (JP)

(72) Inventor: Eiichi Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 340 days.

(21) Appl. No.: 16/793,083

(22) Filed: Feb. 18, 2020

(65) Prior Publication Data

US 2020/0276834 A1  Sep. 3, 2020

(30) Foreign Application Priority Data

Feb. 28, 2019 (JP) .............................. JP2019-036788

(51) Int. Cl.

| | | |
|---|---|---|
| *B41J 11/00* | (2006.01) | |
| *B41J 2/21* | (2006.01) | |
| *G01N 21/359* | (2014.01) | |
| *B41J 2/045* | (2006.01) | |
| *B41J 29/393* | (2006.01) | |

(52) U.S. Cl.
CPC ........ *G01N 21/359* (2013.01); *B41J 2/04558* (2013.01); *B41J 2/2107* (2013.01); *B41J 11/002* (2013.01); *B41J 11/00212* (2021.01); *B41J 29/393* (2013.01)

(58) Field of Classification Search
CPC ... G01N 21/359; B41J 2/04558; B41J 2/2107; B41J 11/002; B41J 11/00212; B41J 29/393

See application file for complete search history.

(56) References Cited

U.S. PATENT DOCUMENTS

| | | |
|---|---|---|
| 5,060,572 A | 10/1991 | Waizmann |
| 5,276,327 A | 1/1994 | Bossen et al. |
| 6,927,393 B2 * | 8/2005 | Cotte ................... G01N 21/359 |
| | | 250/336.1 |
| 9,057,689 B2 | 6/2015 | Soller et al. |
| 10,105,966 B2 | 10/2018 | Ohshima et al. |
| 2006/0196379 A1 | 9/2006 | Fey et al. |
| 2010/0032571 A1 | 2/2010 | Shelley et al. |

FOREIGN PATENT DOCUMENTS

| | | |
|---|---|---|
| JP | 3754581 | 3/2006 |
| JP | 3797477 | 7/2006 |
| JP | 2009-156474 | 7/2009 |
| JP | 2009-228990 | 10/2009 |
| JP | 2009228990 A * | 10/2009 |

(Continued)

OTHER PUBLICATIONS

Nagai et al., MachineTranslationofJP-2009228990-A, 2009 (Year: 2009).*

(Continued)

*Primary Examiner* — Scott A Richmond
(74) *Attorney, Agent, or Firm* — IPUSA, PLLC

(57) ABSTRACT

A method includes irradiating printed matter, on which an ink containing a solvent is adhered, with light including a near infrared of a predetermined wavelength range, and measuring a spectrum, and determining a quantity of solvent content contained in the printed matter using a pre-created calibration curve model and the spectrum.

9 Claims, 9 Drawing Sheets

(56) References Cited

FOREIGN PATENT DOCUMENTS

| | | |
|---|---|---|
| JP | 4941373 | 5/2012 |
| JP | 4968046 | 7/2012 |
| JP | 2017-013408 | 1/2017 |

OTHER PUBLICATIONS

Extended European search report for 20158319.2 dated Jun. 26, 2020.
Fuller MP et al: "Partial Least-Squares Quantitative Analysis of Infrared Spectroscopic Data. Part I: Algorithm Implementation", Applied Spectroscopy, The Society for Applied Spectroscopy, Baltimore, US, vol. 42, No. 2, Feb. 1, 1988 (Feb. 1, 1988), pp. 217-227, XP000486885, ISSN: 0003-7028, DOI: 10.1366/0003702884428266.

* cited by examiner

FIG.2

$$X = SCORE \times LOADING + RESIDUAL\ VARIANCE$$

⋯DIFFERENCE OF SAMPLE
⋯DIFFERENCE OF WAVELENGTH
⋯MATRIX

ANALYSIS METHOD, ANALYSIS APPARATUS, PRINTER, AND PRINT SYSTEM

CROSS-REFERENCE TO RELATED APPLICATIONS

This application is based on and claims priority to Japanese Patent Application No. 2019-036788, filed on Feb. 28, 2019, the entire contents of which are incorporated herein by reference.

BACKGROUND OF THE INVENTION

Field of the Invention

The present invention relates to an analysis method, analysis apparatus, print apparatus, and print system.

Description of the Related Art

It is disclosed that the amount of solvent in a film formed on a sample by printing is processed based on an optical change of irradiated infrared ray such as Fourier transformation infrared spectroscopy and infrared absorption spectroscopy, and the residual solvent content contained in the film is measured (Japanese Laid-Open Patent Application No. 2009-156474, paragraph [0004], etc.). Specifically, the ratio of the peaks of each measurement is calculated.

However, in Patent Document 1, the value can only be obtained as the ratio between the peak of the amount of the solvent and the peak of the amount of the solute measured using infrared rays. Therefore, the accuracy in determining the quantity of solvent is low.

Therefore, according to the disclosure of the present invention, it is an object to improve the accuracy of analyzing the amount of solvent.

SUMMARY OF THE INVENTION

A method includes irradiating printed matter, on which an ink containing a solvent is adhered, with light including a near infrared of a predetermined wavelength range, and measuring a spectrum, and determining a quantity of solvent content contained in the printed matter using a pre-created calibration curve model and the spectrum.

BRIEF DESCRIPTION OF THE DRAWINGS

FIG. 2 is an example of a matrix for differences in wavelengths and samples in the near infrared spectrum according to an embodiment of the invention.

DESCRIPTION OF THE EMBODIMENTS

Figure 1A:
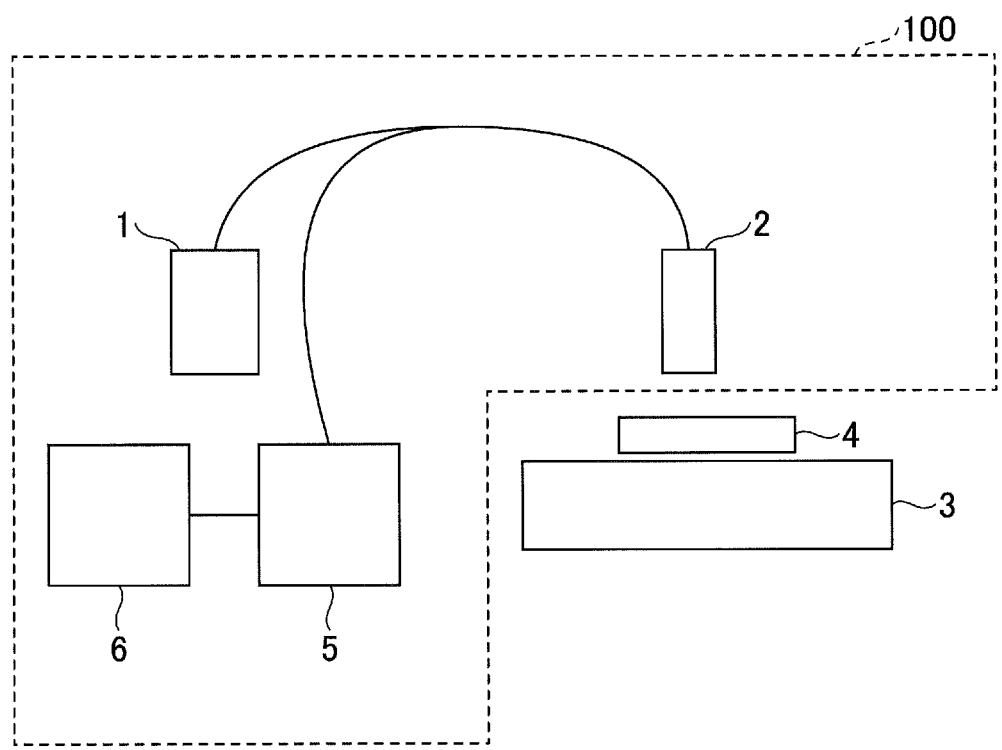
FIG. 1A is a schematic diagram of an analysis apparatus according to an embodiment of the present invention.

Hereinafter, each embodiment is described with reference to the accompanying drawings. In the present specification and the drawings, for the components having substantially the same functional configuration, the overlapping description is omitted by adding the same reference numerals.

The present invention can be applied to a case of printing any ink on any recording medium by any printing method. The term "printing" in this disclosure may include printing by an image forming apparatus (e.g., a multifunctional peripheral, etc.) that forms an image on a recording medium such as cut paper, film, or serial book paper, as well as printing when an ink jet apparatus, such as wallpaper printing or metal pattern printing (e.g., printing a conductive pattern such as an electrode of a battery), is applied to an industrial usage.

In this disclosure, the range "xx-yy" includes xx (i.e., the lower limit) and yy (i.e., the upper limit). In other words, xx-yy means xx or greater and yy or smaller.

<Overview>

First, an outline of an embodiment of the present invention is described. In one embodiment of the present invention, a solvent content (also called a solvent amount) contained in a printed matter, to which an ink containing the solvent is attached (i.e., an ink is attached to a printed material), to analyze the solvent content. More specifically, a plurality of spectra is measured while irradiating the printed matter with light containing a predetermined wavelength range in the near infrared region (typically 700-2500 nm). The spectra of near infrared spectroscopy are acquired at high speeds, and the residual solvent content is monitored from the correlation between the spectral shape of the acquired full wavelength range and the conventional reference value of gas chromatography (also referred to as the calibration curve model, which is described in detail below). Because an evaluation of the residual solvent content of conventional ink is performed using gas chromatography, a long analytical time is required. Therefore, real-time monitoring is not possible.

In one embodiment of the present invention, the residual solvent content obtained by gas chromatography can be accurately monitored by obtaining the near infrared spectrum as a calibration curve model by determining the correlation between the reference value of the residual solvent content obtained in advance and the shape of the near infrared spectrum.

Thus, in the embodiment of the present invention, the determination of residual solvent content in an ink-jet ink printed matter can be performed quickly and conveniently (an analysis time is about 100 ms per one data) with a high spatial resolution.

<Configuration Diagram of Analyzer>

FIG. 1A is a diagram illustrating the structure of an analysis apparatus 100 according to an embodiment of the present invention. An analysis apparatus 100 analyzes the residual solvent content in the printed matter 4 on a sample table 3. More specifically, the analysis apparatus 100 acquires a near infrared spectrum of the printed matter 4 immediately after printing and performs multivariate analysis to quickly monitor the residual solvent content in the printed matter 4.

Further, the analysis apparatus 100 may be configured to perform a feedback control based on the determined quantity value that is acquired so that printing can be performed while appropriately modifying the drying conditions. The analysis apparatus 100 includes a sensor 5 for spectroscoping near infrared spectrum with a probe 2 through an optical fiber, a light source (halogen lamp) 1, and an information processing apparatus (for example, a computer such as a personal computer for measurement and analysis) 6 for processing data. The information processing apparatus 6 stores data of a calibration curve model in any memory in the information processing apparatus 6.

Figure 1B:
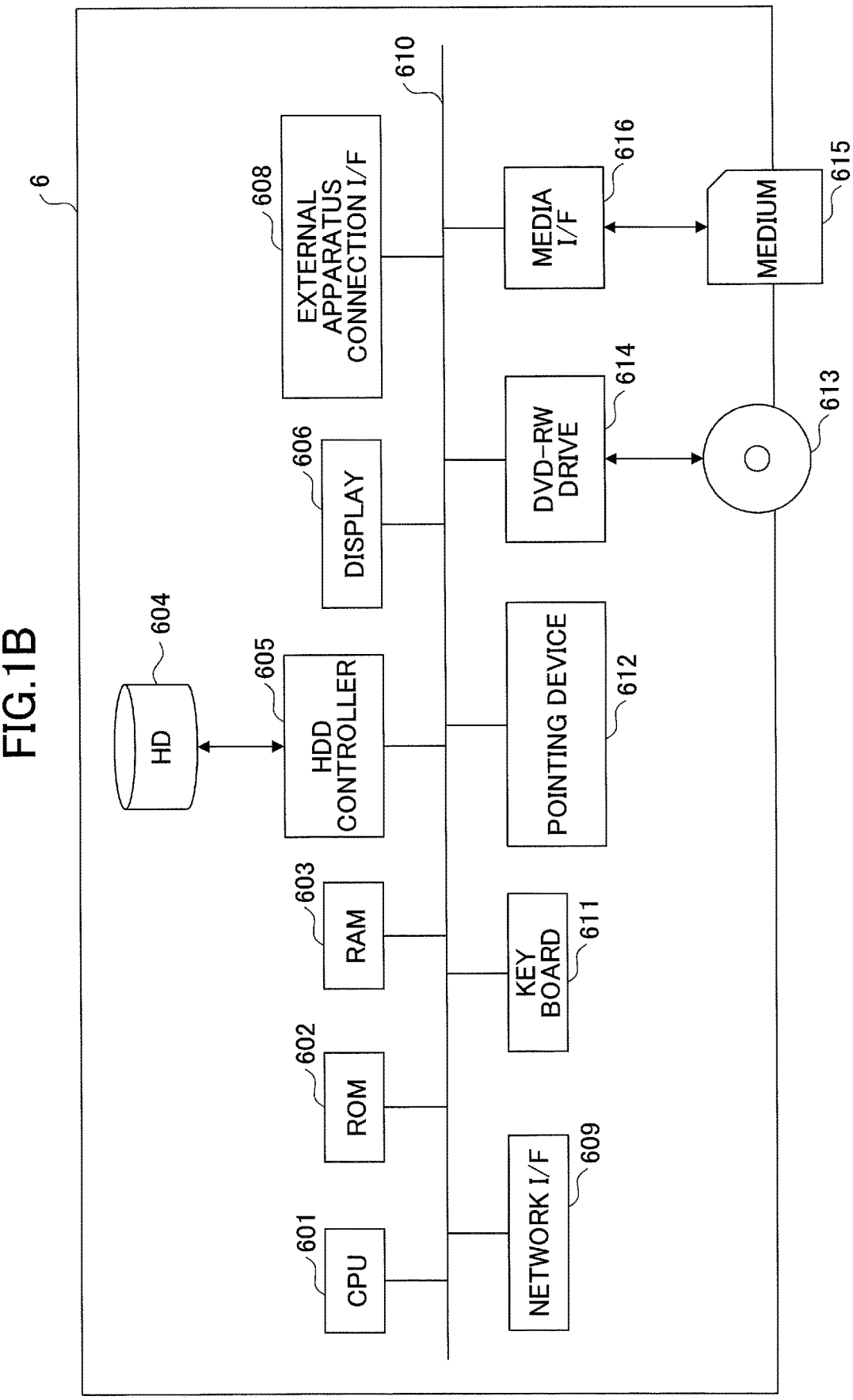
FIG. 1B illustrates the structure of an information processing apparatus 6.

FIG. 1B illustrates a hardware structure of the information processing apparatus 6. Hereinafter, the hardware structure of the information processing apparatus 6 is described. As illustrated in FIG. 1B, the information processing apparatus 6 is constructed by a computer and includes a CPU 601, a ROM 602, a RAM 603, an HD 604, an HDD (hard disk drive) controller 605, a display 606, an external device connection I/F (Interface) 608, a network I/F 609, a data bus 610, a keyboard 611, a pointing device 612, a DVD-RW (Digital Versatile Disk Rewritable) drive 614, and a media I/F 616, as illustrated in FIG. 1B. In this, the CPU 601 controls the entire operation of the information processing apparatus 6. The ROM 602 stores a program used to drive the CPU 601, such as an IPL. The RAM 603 is used as the work area of CPU 601. The HD 604 stores various data such as a program. The HDD controller 605 controls the reading or writing of various data to the HD 604 in accordance with the control of the CPU 601.

The display 606 displays various information such as a cursor, menu, window, character, or image. The external device connection I/F 608 is an interface for connecting various external devices. In this case, the external device may be, for example, a USB (Universal Serial Bus) memory or a printer. The network I/F 609 is an interface for performing data communication using the communication network 100. A bus line 610 is an address bus, data bus, or the like for electrically connecting components such as a CPU 601 illustrated in FIG. 1B. The keyboard 611 is also a type of input means with a plurality of keys for inputting characters, numbers, various indications, and the like. The pointing device 612 is a kind of input means for selecting and executing various instructions, selecting a processing target, moving a cursor, and the like.

The DVD-RW drive 614 controls the reading or writing of various data to the DVD-RW 613 as an example of a removable recording medium. It is not limited to the DVD-RW, but may be a DVD-R, etc. The media I/F 616 controls the reading or writing (storage) of data to a recording medium 615, such as a flash memory.

The probe 2, the sensor 5, and the light source 1 are also referred to as a measuring instrument, and the information processing apparatus 6 may be also referred to as an analyzer.

<Acquisition of Spectrum in Near Infrared Spectroscopy>

First, the acquisition of spectrum of the near infrared spectroscopy is described. The light out of the probe 2 reaches the ink-jet ink printed matter 4 and analyzes the reflected light that is reflected vertically. The wavelength range is measured from 890 nm to 2500 nm. When performing multivariate analysis, the spectra in the wavelength range of 890 nm to 1000 nm and 2400 nm to 2500 nm are cut off because of noise. Therefore, the wavelength range actually used for the analysis is 1000 nm to 2400 nm.

In near infrared spectroscopy, sensors that perform measurements in a narrower wavelength range are commonly available. In one embodiment of the present invention, a wavelength range of 1000 nm to 1900 nm is required for multivariate analysis in order to separate an effect other than the solvent components. Therefore, it may be necessary to use the analysis apparatus 100 to measure a wide range of wavelengths.

In addition, since the spot diameter illuminated by light is about 5 mmΦ, it can be evaluated at a high spatial resolution in principle compared to a conventional gas chromatography method. On the other hand, the effect of in-plane variation cannot be evaluated because the quantity value acquired by the conventional gas chromatography method is determined in a large area. When creating the calibration curve model, data on the in-plane distribution of the near infrared spectrum can be acquired on the same printed matter to create a highly accurate calibration curve model.

The near infrared spectrum can be acquired at a very high speed of about 0.1 seconds. Near infrared reflectometry is described. The reflectance is determined from the intensity T0 of incident light and the intensity of reflected light.

$$R = I/I0 \tag{Equation 1}$$

The absorbance is acquired by transforming the reflectance using the following equation.

$$A = -\log(R) \tag{Equation 2}$$

The near infrared spectrum detects a peak derived from a functional group at the ends of the chemical composition. Accordingly, an organic substance is characterized by peaks of various materials in the same wavelength range. In one embodiment of the present invention, the near infrared spectrum alone is difficult to analyze because the evaluation is susceptible to effects other than solvent components, and multivariate analysis is required.

«Multivariate Analysis»

Next, multivariate analysis for analyzing spectrum is described. First, a general flow of multivariate analysis is described. The near infrared spectrum is processed by the Savitzky-Golay method for second derivatives of the spectrum. A PLS regression analysis is performed on the spectrum with the second derivative to complete the calibration curve model. In this case, the determined quantity value of gas chromatography corresponding to the near infrared spectrum on a one-to-one basis is required.

Figure 3:
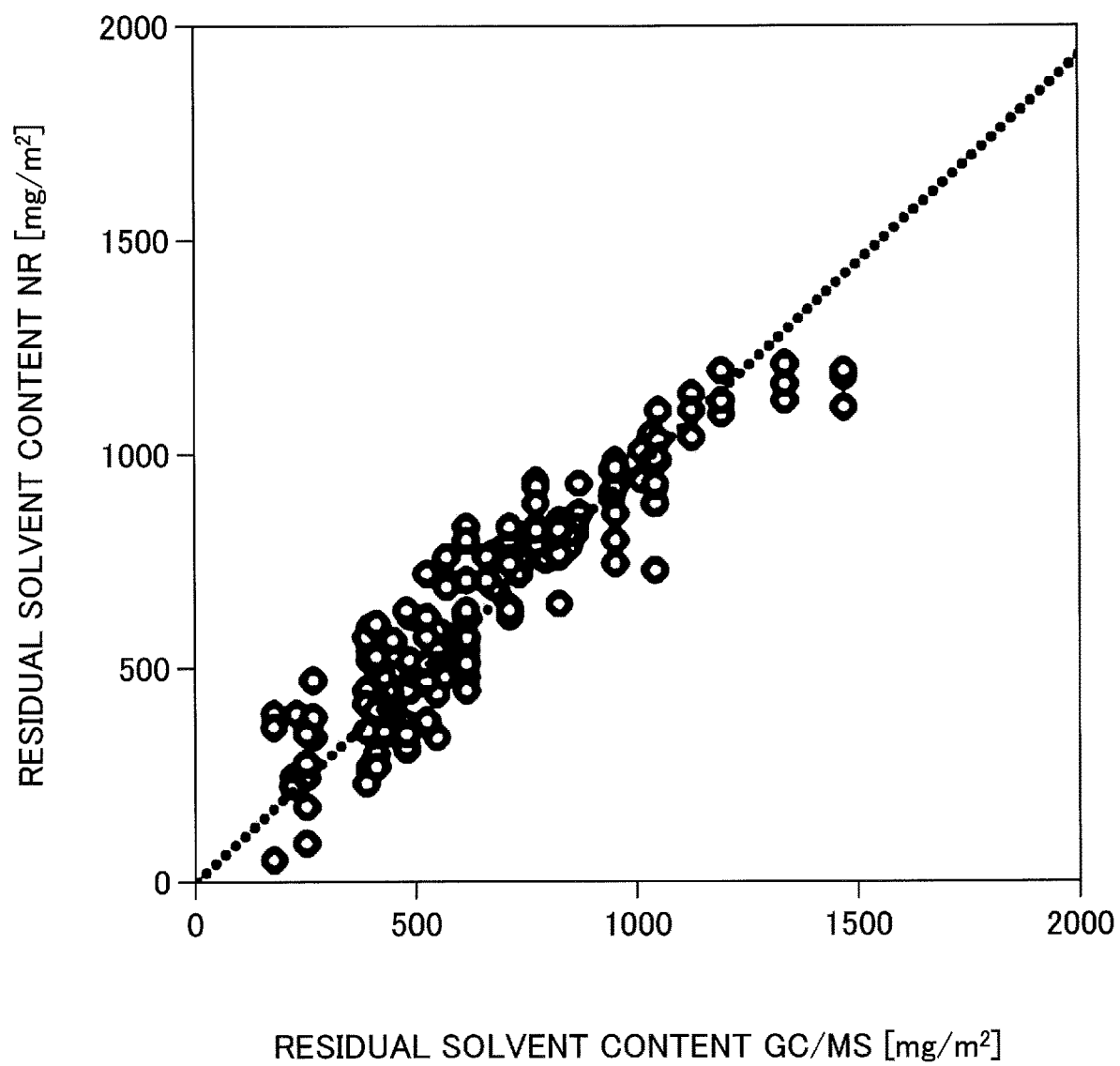
FIG. 3 is an example of a calibration curve model that enables prediction of residual solvent in the near infrared spectrum relative to conventional gas chromatography according to the embodiment of the invention.

The principle of the multivariate analysis is described. The near infrared spectrum is regarded as a matrix X for a difference of wavelength and a difference of sample. A matrix X in which the data of the difference of the sample are arranged on the vertical axis and the difference of the wavelength is arranged on the horizontal axis, as illustrated in FIG. 2. The matrix of the standard value of the residual solvent content acquired by gas chromatography is Y. Then, a calibration curve model is created by calculating the correlation between matrix X and matrix Y. That is, the calibration curve model is the matrix (regression coefficient of regression analysis). FIG. 3 is an example of the calibration curve model that enables the residual solvent content to be predicted using the near infrared spectrum compared to the conventional gas chromatography method according to the embodiment of the present invention.

The residual solvent content of the unknown sample can be determined by applying a pre-prepared calibration curve model to an unknown sample Xnew (near infrared spectral data).

The multivariate analysis is classified into a principal component analysis and a regression analysis.

<Principal Component Analysis>

Here, a principal component analysis is described. The near infrared spectrum is highly multivariate and therefore concentrates on less principal components. The principal components that make a greater contribution to a change in residual solvent content are extracted in order. The principal component is extracted by maximizing the dispersion of a first principal component (which is the principal component most correlated with the change in the reference value of the residual solvent content) and the subsequent principal component by maximizing the dispersion under conditions orthogonal to the previously determined principal component. The purpose of maximizing the variance of the principal component is to provide the principal component with as much explanatory capacity as possible for a change in an observed value. The selected principal component is orthogonal to each other and can represent a set of observed values as a linear combination. In other words, the principal component is the orthogonal basis of the set of observed values. The orthogonality of a principal component vector is derived from the eigenvector of a covariance matrix (or a correlation matrix) and the covariance matrix is a real symmetric matrix. The principal component analysis is the simplest multivariate analysis based on purely eigenvectors. The principal component analysis is considered to reveal the internal structure of the data from the perspective of better explaining the variance of the data. In many cases, multivariate data are large in dimensions, making it difficult to visualize each variable axially, but the data can be visualized by aggregating the information in fewer dimensions using principal components analysis. The information obtained from the aggregation is a projection of the data set from the space of the original data variable into the space formed by the principal component vector, which extracts useful information from the original data. Visualization of the data structure by principal component analysis is substantialized by selecting a small number of principal components from the beginning as much as necessary for visualization. The principal component analysis is a major technique in exploratory data analysis and is also used to construct predictive models. The principal component analysis is performed by eigenvalue decomposition of observed values into covariance matrices, correlation matrices, or (mostly normalized) singular value decomposition of data matrices.

The results of principal component analysis are evaluated by score and loading. A score is the coefficient on the base vector when a data point is represented by the principal component vector, indicating the magnitude of the contribution of a principal component vector to the data point. Loading is the weight of individual (normalized) observed values for a certain score, given as a correlation coefficient between the observed value and a principal component. The principal component analysis is sensitive to the relative scale between the observed values. Evaluation of the principal component analysis is interpreted through either a principal component plot visualizing a principal component score and a principal component load amount, respectively, or a biplot overlapping both of these. Depending on the software and functions used to perform the principal component analysis, there are subtle differences in the methods used to normalize the observed values and in the algorithms used to calculate numerical values, and the individual methods are not necessarily equivalent to each other. For example, in a solvent, the solvent components are concentrated into a single major component because of decreases due to drying, regardless of the solvent type, and because the spectral shape is very similar.

Generally, the distribution of residual solvent content is insufficient for the first principal component, PC1 alone. Projecting the sample onto the principal component axis still has meaningful variance. Further definition of a new axis gives the second principal component PC2. Once PC1 and PC2 have been determined, each sample can be plotted as a set of points on the coordinate space consisting of the two axes. These diagrams are called score plots.

Figure 4:
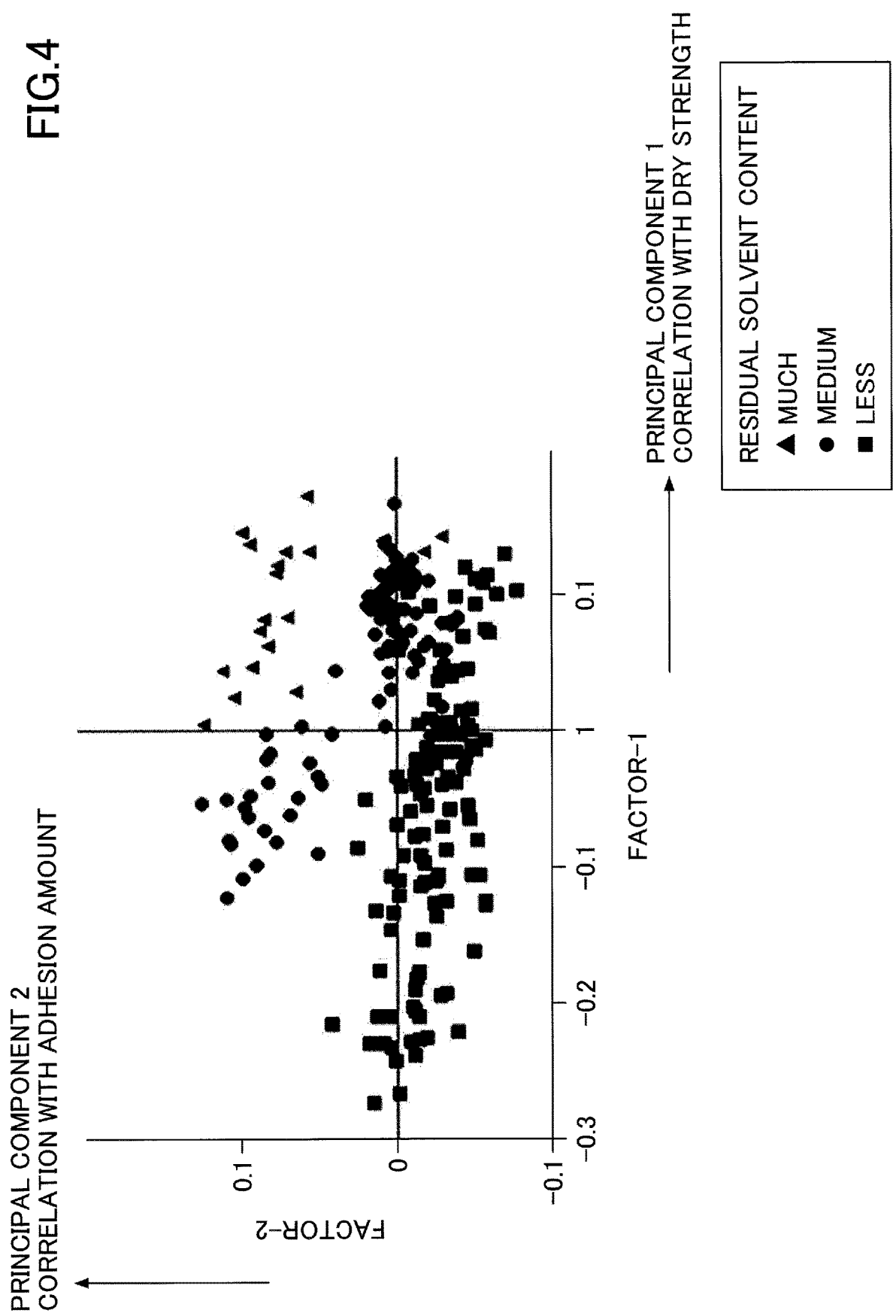
FIG. 4 illustrates an example of a score plot according to the embodiment of the present invention.

FIG. 4 is an example of a score plot according to one embodiment of the invention. In FIG. 4, a sample with a large residual solvent content is distributed in a region where both of a factor 1 (a principal component 1) and a factor 2 (a principal component 2) are large. The distance between samples on the score plot represents similarity. Sequential increase in the number of the principal components improves the reliability of explaining the standard value of the residual solvent content. A near infrared spectrum called loading is assigned to each principal component. By the loading, it is meant that the more distant the variable from the center, the greater the contribution of the variable and the less distant the variable from the center, the smaller the contribution of the variable. The score plot can be chemically interpreted based on the meaning of the principal component PC as indicated by the loading.

When a new unknown sample is measured, the score and loading are calculated in the same way. It is possible to predict the residual solvent content from a region where an unknown sample is plotted on the score plot of the calibration curve model. In FIG. 4, the residual solvent content of the sample is illustrated in three steps: "much," "medium," and "less." However, it is possible to plot a distribution of the residual solvent content in a more detailed manner.

The degree to which the sample is not well represented by the calibration curve model is called residuals, and the larger this value, the lower the reliability of the calibration curve model. The smaller the number of principal components characterizing the data, the better the calibration curve model. As a criterion for selecting the number of principal components, conditions under which the residual variance of the calibration curve model becomes sufficiently small are selected.

<Regression Analysis>

The regression analysis is described. There are various regression analyses such as a multiple regression analysis, principal component regression analysis, and PLS regression analysis. A PLS regression analysis is preferably used.

The multiple regression analysis is a method of directly regressing the value of X to Y. The multiple regression analysis is mathematically difficult to apply to the embodiment of the present invention because of the problem of collinearity between the X variables. Relationships between variables are difficult to interpret.

The principal component regression analysis is a method of regressing Y by analyzing X as the principal component and applying multiple regression analysis to the score.

A PLS regression analysis is a method of simultaneously modeling X and Y. In the PLS regression analysis, there is no problem of collinearity, X explanatory variables are unlimited, relationships between variables can be interpreted, and multiple Y values can be regressed simultaneously.

The accuracy of the calibration curve model can be verified by comparing the reference value of the residual solvent content with the predicted value of the regression model. If the calibration curve model is highly accurate, points are linearly plotted with slope 1 through which the relationship between the reference value and the predicted value passes through the origin. The PLS regression analysis uses Y as a regression coefficient for the X variables that is strongly related to Y.

<Pre-Processing>

Next, a pre-processing before subjecting the near infrared spectrum to a multivariate analysis is described. The purpose of the pre-processing is to remove information, which is about the physical shape of the sample or is derived from the analysis apparatus 100, from the data. The pre-processing provides a highly accurate calibration curve model with less error and a smaller number of the principal components. It also has the advantage of easier interpretation of the result.

A second derivative using a Savitzky-Golay method is used as the pre-processing method of the near infrared spectrum. In the near infrared spectrum, it is known that there is a strong baseline variation is due to the influence of light scatter on a front surface. In the near infrared spectrum, an addition baseline shift and a multiplication baseline shift occur due to the influence of scattered light on a sample surface. The addition baseline shift is a phenomenon in which the baseline shifts up and down at approximately the same rate for all wavelengths. The multiplication baseline shift is a phenomenon in which the spectrum is skewed upward to the right when the scattering ratio differs depending on the wavelength.

Smoothing is performed during processing of the second derivative. The smoothing has an effect of reducing data noise and is calculated using data from several adjacent points. It is also necessary to consider that when the smoothing effect is increased, a minute peak is less detectable. The effect of second derivative treatment is to correct for baseline and to separate overlapping peaks.

Addition scattering and multiplication scattering can be eliminated by processing the second derivative of the Savitzky-Golay method. Thus, an ideal scatter-free near infrared spectrum of interest can be analyzed.

«Acquisition of Reference Value to Create Calibration Curve Model»

Figure 5:
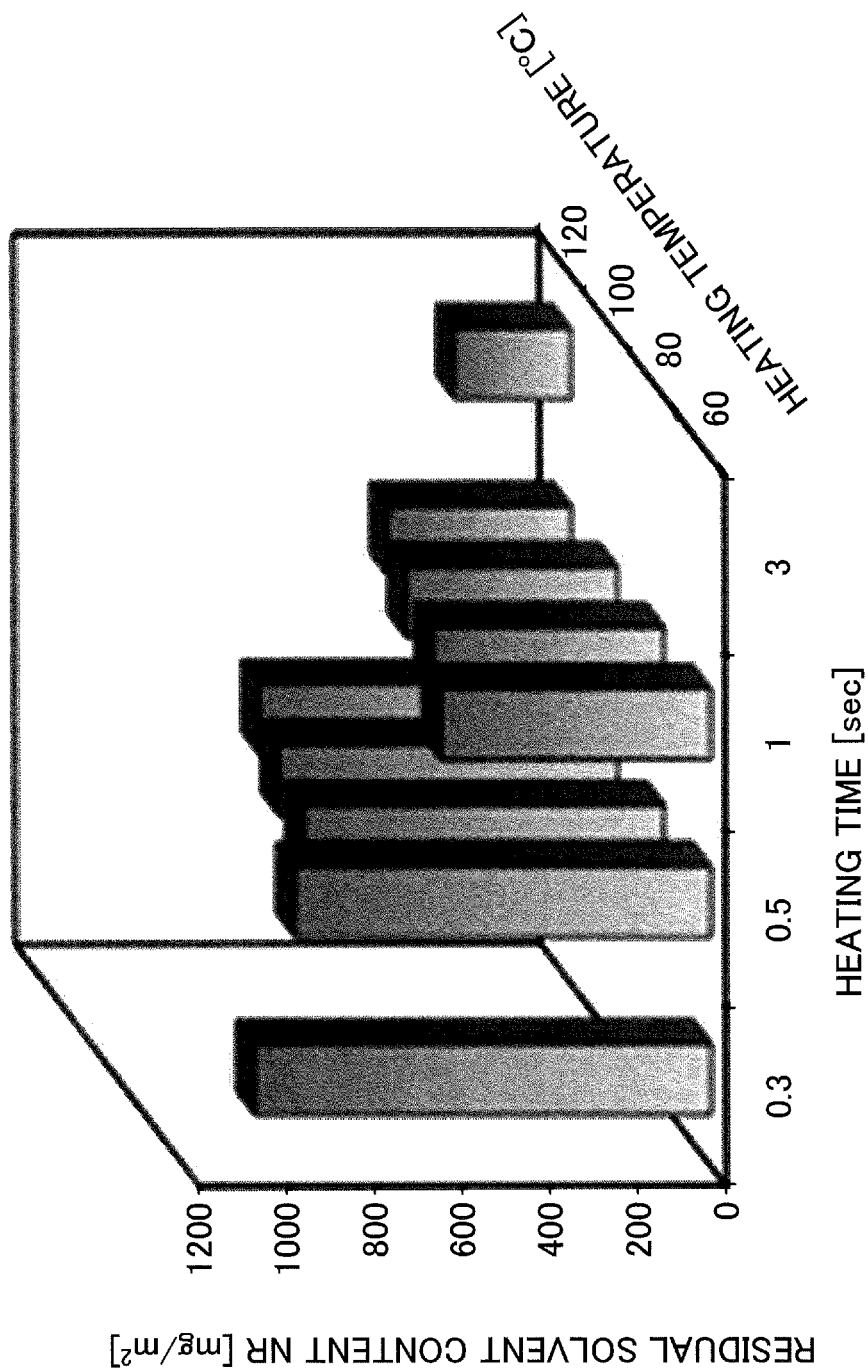
FIG. 5 illustrates an example of determined quantity value obtained by gas chromatography according to the embodiment of the invention.

Next, gas chromatography, which is a method of acquiring reference values for creating a calibration curve model, is described. FIG. 5 illustrates an example of the determined quantity value acquired by gas chromatography according to the embodiment of the invention. The example of FIG. 5 illustrates an example in which only the drying conditions were adjusted, but in practice various factors such as the amount of ink adhered and the paper type were adjusted.

Either gas chromatography or mass spectrometry combined with gas chromatography can be used. In one embodiment of the invention, gas chromatography mass spectrometry was used. An extract liquid from a sample that is obtained by cutting the printed matter to a certain size and soaked in a certain amount of tetrahydrofuran and left overnight is measured. By immersing the printed material in tetrahydrofuran, the solvent contained in the ink dissolves in the tetrahydrofuran.

It is preferable to previously acquire the standard values for various types of printed matter. It is preferable to measure samples, in which the conditions of the heating temperature immediately after printing and the heating time, the adhesion amount of ink at the time of printing, the paper type, the print method, the drying method, and the like are changed, and to previously acquire the reference values of samples in various situations.

For example, the calibration curve model may be created from a plurality of spectra acquired by irradiating a plurality of samples having varying heating temperatures and heating times with light including at least a predetermined wavelength range in the near infrared region. For example, the calibration curve model can be created from a plurality of spectra acquired by irradiating light including a predetermined wavelength range in the near infrared region to a plurality of samples having varied at least one of: the amount of ink adhered to the printed matter; the type of printed matter (e.g., the type of paper having different ingredients and thicknesses, such as coated paper and plain paper); the ink formulation; the heating method (e.g., heat transfer heating, convective heating, radiant heating); the heating temperature; the heating time; and the print method (e.g., serial or line ink jet printing).

In addition, the gas chromatography mass spectrometry method can be used to acquire the determined quantity value for each solvent type, and hence a calibration curve model can be created to predict the determined quantity value for each solvent type.

<Multivariate Analysis of Unknown Sample>

Next, an actual multivariate analysis of an unknown sample is described. The matrix of the spectrum of an unknown sample is analyzed by performing principal component analysis for scoring and loading with the same processing as when the calibration curve model was created, and the distribution of the unknown sample in the score plot (e.g., FIG. 4) is analyzed to obtain the residual solvent content Y of the unknown sample.

«Printing Process»

Next, a printing process for creating the printed matter is described. The print apparatus used is an ink-jet ink print apparatus. The size of the print apparatus can be either a home serial printer or a large machine for a high-speed serial book.

The following indicates printing conditions that are preferable to be incorporated into the calibration curve model.

Ink adhesion amount (including those that change in the drying process)
Paper type
Ink formulation
Drying method
Print method
Heating temperature (exceeding or not exceeding a resin film forming temperature and wax melting point)
Resin film formation
Fusion of wax
Discharge method (one path or multiple paths)

In one embodiment of the present invention, it is first important to create the calibration curve model by adjusting the heating temperature and heating time of the printed matter.

In addition, by installing a heat drying device immediately after printing of the serial printer, the drying state can be controlled by heat drying and a wide range of the residual solvent content can be controlled. Even in a large machine for a high-speed serial book, the residual solvent content can be controlled to be an intended value because a heat drying mechanism is typically provided in such a large machine.

In the embodiment of the present invention, a calibration curve model was generated using a serial printer coupled with a heat drying device and evaluated under various printing conditions. In the case of the serial printer, it is advantageous to easily change the paper type. However, if it is desirable to accurately predict the residual solvent content in a high-speed serial printer, it is preferable to create a calibration curve model with the sample printed on the high-speed serial printer.

Figure 6:
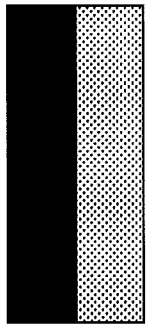
FIG. 6 illustrates an example in which the near infrared spectrum changes while maintaining the residual solvent content the same according to the embodiment of the present invention.

FIG. 6 illustrates an example of a point when a calibration curve model is created in consideration of various situations. In one example illustrated in FIG. 6, it is found, for example, that the same residual solvent content extremely affects the spectrum when the reflection spectrum of near infrared light is acquired when the paper type is changed, and that the spectrum is extremely changed when the paper type is changed even with the same ink type. Further, in the example illustrated in FIG. 6, although the residual solvent content is the same, when the residual solvent content is large and very dry, and when the residual solvent content is small and not very dry, even when the printed matter having the same residual solvent content is obtained, the printed matter having the same residual solvent content is obtained with relatively weak paper peaks, and when the printed matter having the same residual solvent content is obtained with relatively strong paper strength, it has been found that the reflection spectrum of near infrared light changes.

In the reflection spectrum of near infrared light, it is thought that light reaches the paper, and the spectrum changes even with the same residual solvent content due to the difference in the situation. Therefore, it is important to determine whether the calibration curve model is one that takes various situations into consideration.

<Configuration Diagram of Print Apparatus>

Next, a method for performing an in-line measurement is described by incorporating a mechanism performing near infrared spectroscopy and multivariate analysis into a print apparatus for printing the printed matter. Because a method of near infrared spectroscopy enables real-time measurement of the residual solvent content, a measurement probe can be assembled into the print apparatus to measure a value immediately after printing.

In addition, a feedback mechanism may be provided to apply a feedback control based on the determined quantity value of the residual solvent content so as to control the printing conditions.

Figure 7:
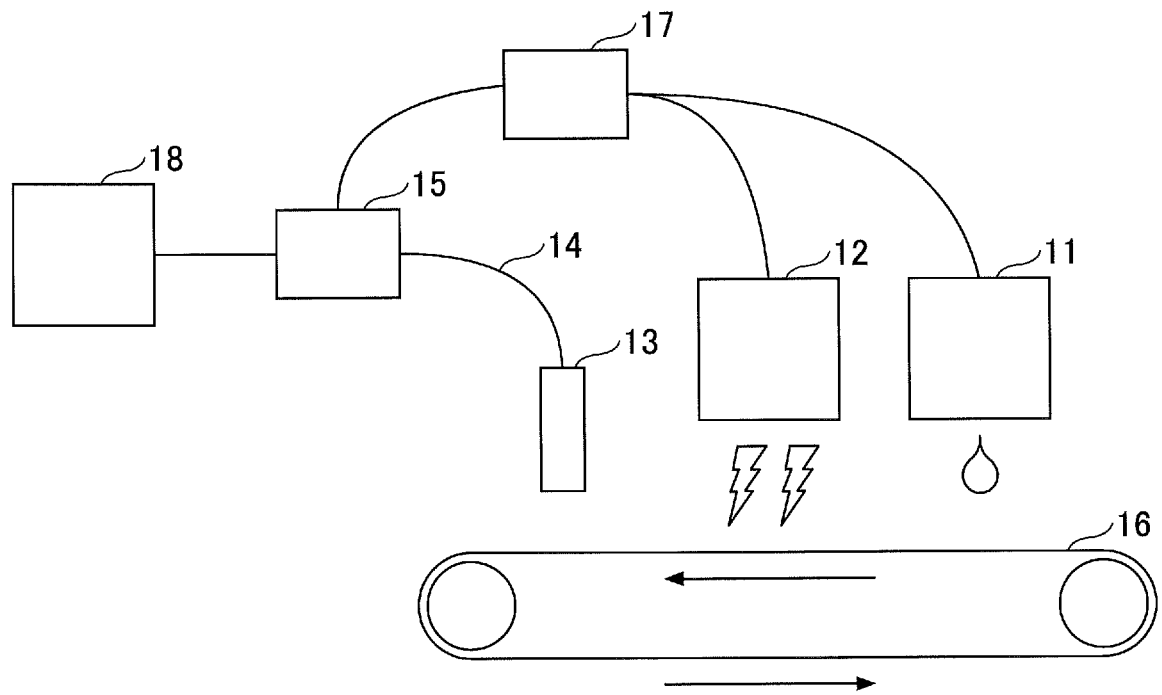
FIG. 7 is a schematic diagram of a print apparatus according to another embodiment of the present invention.

FIG. 7 is a diagram illustrating a configuration of a print apparatus 200. The printer 200 includes a head 11, a drying device 12, a near infrared spectroscopy probe 13, an optical fiber 14, a spectrometer 15, a paper transfer mechanism 16, a feedback control mechanism 17, and an analysis mechanism 18. The print apparatus 200 stores data of the calibration curve model data in an arbitrary memory within the print apparatus 200.

The analysis mechanism 18 analyzes the residual solvent content in the printed matter. Specifically, the analysis mechanism 18 acquires the near infrared spectrum obtained by the probe 13 and spectrometer 15 and performs multivariate analysis (i.e., using the calibration curve model described above) to quickly monitor the residual solvent content in the printed matter to obtain measurements.

The feedback control mechanism 17 modifies the drying conditions (i.e., controls the heating temperature of the drying device 12) based on a measurement value of the residual solvent content acquired by the analysis mechanism 18.

The head 11 is also referred to as an ink discharge unit, the drying device 12 is also referred to as a heat unit, the probe 13 and the spectrometer 15 are referred to as a measuring unit, the analysis mechanism 18 is referred to as an analysis unit, and the feedback control mechanism 17 is referred to as a heat control unit. A solvent volumetric analyzer, the measuring unit and the analysis unit are combined so as to be referred to as a solvent volumetric analyzer.

Printing is evaluated by the set value of a certain drying condition, and the printed material that passes through the drying step immediately after printing is used to acquire the reflected light in the near infrared spectrum using probe 13. The resulting reflection spectrum of near infrared light is transmitted to an analysis mechanism 18 which has a multivariate analysis function, and a measured value of the residual solvent content is acquired by using a previously prepared calibration curve model.

If the residual solvent content is out of line with the intended value, the sensed solvent amount is sent as a signal to the feedback control mechanism 17 so as to change the drying process conditions. For example, if the predicted value of the residual solvent content is higher than the target, the condition is changed to make the drying condition stronger and the print evaluation is performed again. The reflection spectrum of near infrared light is automatically conserved and a multivariate analysis system (analysis mechanism 18) is provided within the apparatus.

The in-line measurement can be achieved by attaching the analysis apparatus 100 to a serial printer, and the analysis apparatus 100 can be incorporated into a large machine of a high-speed serial printer.

Figure 8:
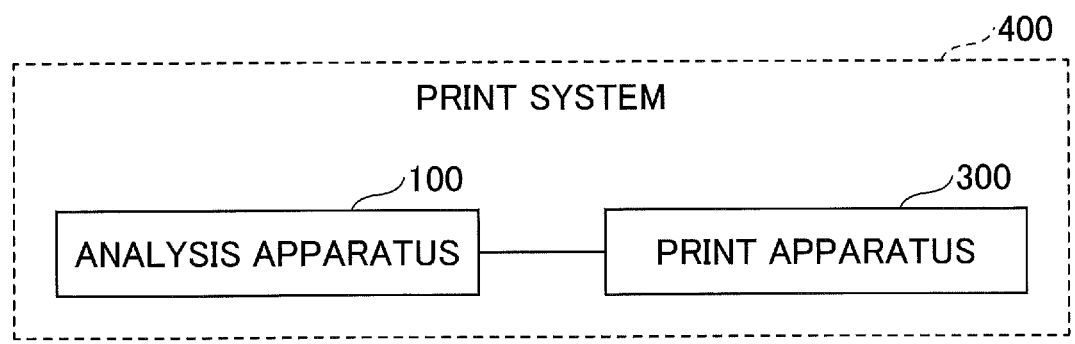
FIG. 8 illustrates an analyzing apparatus, a print apparatus, and a print system according to the embodiment of the present invention.

FIG. 8 is a diagram for explaining the analysis apparatus, a print apparatus, and a print system according to an embodiment of the present invention. In one embodiment of the invention, the analysis apparatus 100 can be used to quantify the residual solvent content in the printed matter, as illustrated in FIG. 1. In addition, as illustrated in FIG. 7, the print apparatus 200 is capable of quantifying the residual solvent content in the printed matter printed by the print apparatus 200 (to be in-line). In addition, as illustrated in FIG. 8, the analysis apparatus 100 can measure the residual solvent content in the printed matter printed by the print apparatus 300 (for example, the print apparatus without the solvent content analysis unit, such as the print apparatus 200) (to make offline). The combination of the analysis apparatus 100 and the print apparatus 300 of FIG. 8 are also referred to as a print system 400. In FIG. 8, the print apparatus 300 controls the temperature of the heat source of the heat unit based on the analysis results of the analysis apparatus 100.

Figure 9:
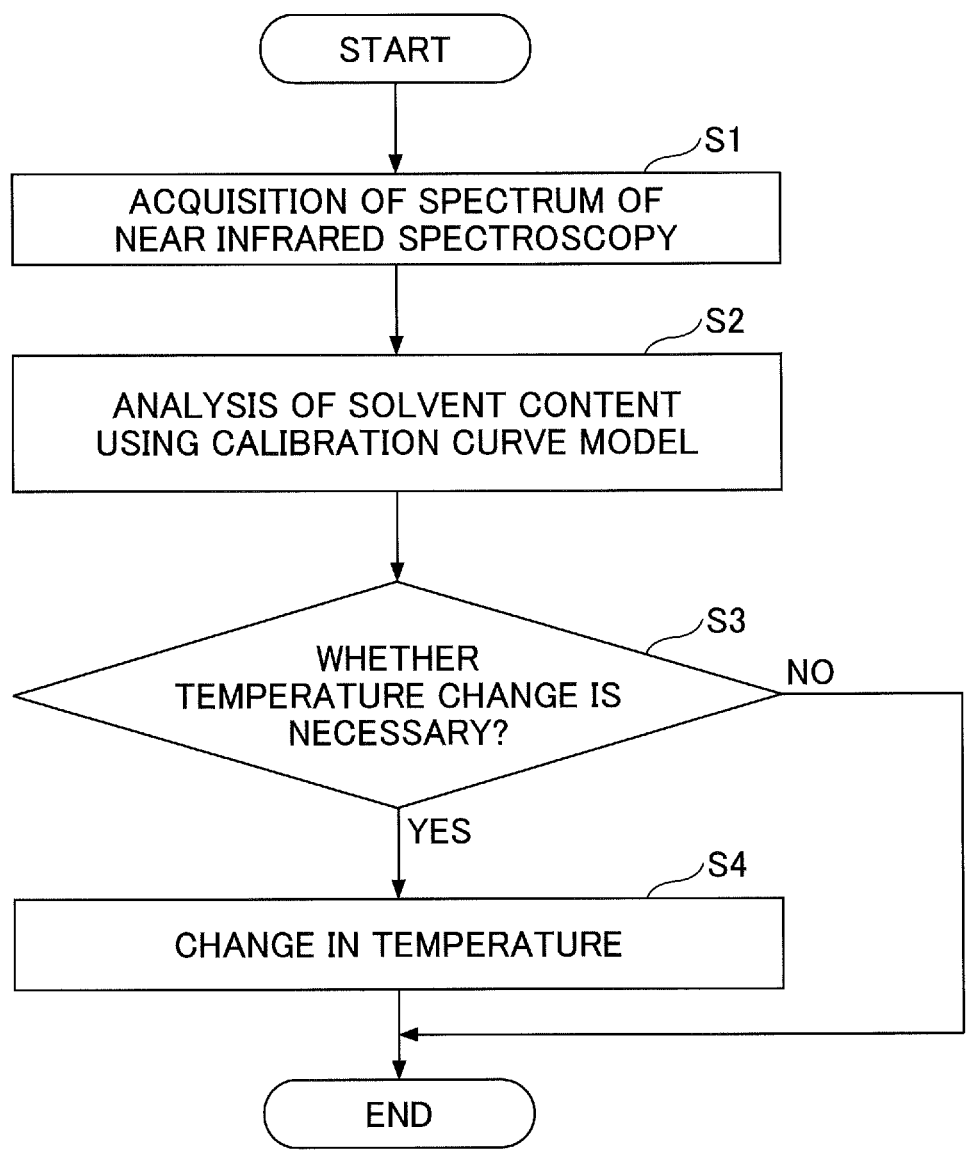
FIG. 9 illustrates a flowchart illustrating an analysis process and analysis result according to an embodiment of the present invention and a process for changing the heating temperature based on the analysis process and the analysis result.

FIG. 9 is a flowchart of an analysis process and a heating temperature change process based on an analysis result according to the embodiment of the present invention.

In step (process) 1 (S1), the spectrum of near infrared spectroscopy is acquired.

In step 2 (S2), the solvent content is analyzed using the calibration curve model.

In step 3 (S3), it is determined whether the heating temperature needs to be changed. If necessary, go to step 4. If not, the process ends.

In step 4 (S4), the heating temperature is changed based on the analysis result of S2. Steps 3 and 4 may not necessarily be performed.

SUMMARY

As described above, in one embodiment of the present invention, within the measurement field in the near infrared region of 1000-2400 nm, a fairly wide range of wavelength ranges are measured and analyzed. When quantifying the residual solvent content by subjecting the near infrared spectrum to multivariate analysis, the determined quantity value are calculated by multivariate analysis of the overall shape of the spectrum, rather than by a method of determining the concentration from the reflectance of a specific wavelength.

The near infrared spectrum of ink-jet ink printed matter is influenced by a variety of factors, including water, solvent, pigment, resin, wax, ink raw material such as surfactant, paper types, ink deposits, discharge methods, drying methods, and the like.

These various factors affect different wavelength ranges of the spectrum. In order to quantify the residual solvent content from the near infrared spectrum of ink-jet ink printed matter, the calibration curve model is preferably developed that takes into account a spectral change other than the solvent content. This requires measurement data over a wide wavelength range.

It is also contemplated that the printed matter is heated and dried. For the same residual solvent content, the spectrum varies as heating alters the polymeric structure of the resin or wax. This is because when heating and drying is carried out, not only a decrease in the solvent content but also phenomena such as agglomeration of pigment, formation of resin film, melting of wax, etc. occur. In addition, even with the same residual solvent content, the spectrum will change when there is a printed matter that is dried in the state where the ink adheres to a large amount and when there are printed matter that are not dried in the state where a small amount of the ink adheres.

By adding all the measurement data for these various situations to a single calibration curve model, it is possible to create a calibration curve model corresponding to the printed matter in various conditions. Specifically, a calibration curve model corresponding to various conditions such as paper type, adhesion amount of ink, drying method, print method, and ink formulation is completed. In addition, a wide range of near infrared spectra should be acquired to enable various situations to be added to one model. By covering the wavelength range where various factors have peaks, it is possible to create a calibration curve model that takes these factors into account when combined with the multivariate analysis.

Thus, in one embodiment of the present invention, multivariate analysis of the results measured using the near infrared light enables real-time monitoring of the residual solvent content that is more quantitative than the infrared light. In other words, in one embodiment of the present invention, the determined quantity value corresponding to gas chromatographic evaluation methods can be acquired and the determined quantity value are obtained using the entire spectral shape without the need for a reference peak, such as infrared spectroscopy, and thus the accuracy of the determined quantity is high.

Effects of the Invention

According to the disclosure of the present invention, the accuracy in analyzing the solvent content can be improved.

The present invention is not limited to the above-described configurations described in the above-described embodiments, and combinations of the above-described configurations and other elements. In these respects, it is possible to change the scope of the invention without departing from the spirit of the invention, and it can be appropriately determined in accordance with an applied mode.

The reference symbols designate as follows:
1 Light source
2 Probe
3 Sample table
4 Printed matter
5 Sensor
6 Information processing apparatus
100 Analysis apparatus
11 Head
12 Drying device
13 Probe
14 Optical fiber
15 Spectroscope
16 Paper transfer mechanism
17 Feedback control mechanism
18 Analysis mechanism
200 Print apparatus
300 Print apparatus
400 Print system

What is claimed is:

1. An analysis method comprising:
irradiating printed matter, on which an ink containing a solvent is adhered, with light including a near infrared of a predetermined wavelength range, and measuring a spectrum; and
determining a quantity of solvent content contained in the printed matter using a pre-created calibration curve model and the spectrum.

2. The analysis method according to claim 1,
wherein the calibration curve model is made from a plurality of spectra acquired by irradiating, with the light including the near infrared of the predetermined wavelength range, a plurality of samples obtained by changing at least one from among:
an ink attached to the printed matter;
a type of the printed matter;
an ink formulation;
a heating method for heating the printed matter;
a heating temperature and a heating time; and
a print method.

3. The analysis method according to claim 1,
wherein the calibration curve model is made from the plurality of spectra obtained by irradiating, with the light including the near infrared of the predetermined wavelength range, the plurality of samples obtained by changing at least the heating temperature and the heating time.

4. The analysis method according to claim 1,
wherein, in the irradiating the printed matter, the predetermined wavelength range of the near infrared is 1000 nm to 2400 nm.

5. The analysis method according to claim 1,
wherein, in the calibration curve model, a correlation between a measurement value of the solvent content contained in the printed matter obtained by using gas chromatography and a measurement value of the plurality of spectra obtained by irradiating the sample with the light including the near infrared of the predetermined wavelength range is determined by PLS regression analysis.

6. The analysis method according to claim 1,
wherein the calibration curve model is created by performing a multivariate analysis of data of samples different in:

an ink attached to the printed matter;

a type of the printed matter;

an ink formulation;

a heating method for heating the printed matter;

a heating temperature and a heating time; or a print method.

7. The analysis method according to claim 1, the analysis method further comprising:

evaluating an in-plane distribution of the solvent content in two dimensions by near infrared spectroscopy at a plurality of points in an printed image of the printed matter.

8. An analysis apparatus comprising:

a measuring instrument for measuring a spectrum by irradiating printed matter, on which an ink containing a solvent is adhered, with light including a near infrared of a predetermined wavelength range and measuring a spectrum; and an analyzer for determining a quantity of solvent content contained in the printed matter using a pre-created calibration curve model and the spectrum measured by the measuring instrument.

9. A print apparatus comprising:

an ink discharge unit that discharges an ink containing a solvent;

a heat unit that heats a printed matter, on which the ink is adhered, to vaporize the solvent contained in the printed matter;

a solvent content analysis unit that determines a quantity of a solvent content contained in the printed matter heated by the heat unit; and a heat control unit that controls a temperature of a heat source included in the heat unit, wherein the solvent content analysis unit includes a measuring unit for measuring a spectrum by irradiating the printed matter with light including a near infrared of a predetermined wavelength range and measuring the spectrum, and an analysis unit for determining the quantity of the solvent content contained in the printed matter using a pre-created calibration curve model and the spectrum measured by the measuring unit, and wherein the heat control unit controls the temperature of the heat source included in the heat unit based on an analysis result acquired by the solvent content analysis unit.

* * * * *